(12) United States Patent
Kawasaki et al.

(10) Patent No.: US 6,189,512 B1
(45) Date of Patent: Feb. 20, 2001

(54) VARIABLE VALVE TIMING ENGINE

(75) Inventors: Takao Kawasaki, Kanagawa; Hatsuo Nagaishi, Yokohama, both of (JP)

(73) Assignee: Nissan Motor Co., Ltd., Yokohama (JP)

(*) Notice: Under 35 U.S.C. 154(b), the term of this patent shall be extended for 0 days.

(21) Appl. No.: 09/390,685

(22) Filed: Sep. 7, 1999

(30) Foreign Application Priority Data

Sep. 7, 1998 (JP) .................................................. 10-252714

(51) Int. Cl.$^7$ .................................................. F02M 51/00
(52) U.S. Cl. ........................ 123/479; 123/90.15; 73/118.2
(58) Field of Search .............. 123/90.15, 90.16, 123/90.17, 198 D, 479, 494; 73/118.2

(56) References Cited

U.S. PATENT DOCUMENTS

| | | | |
|---|---|---|---|
| 4,945,883 | * 8/1990 | Ono et al. ............................... | 123/494 |
| 5,115,782 | 5/1992 | Klinke et al. ........................ | 123/489 |
| 5,190,012 | * 3/1993 | Takahashi ............................. | 123/479 |
| 5,560,199 | * 10/1996 | Agustin .................................. | 60/274 |

FOREIGN PATENT DOCUMENTS

| | | |
|---|---|---|
| 39 40 752 | 6/1991 | (DE) . |
| 42 36 008 | 4/1994 | (DE) . |
| 195 47 496 | 7/1997 | (DE) . |
| 10-37727 | 2/1998 | (JP) . |

* cited by examiner

Primary Examiner—Thomas Denion
Assistant Examiner—Patrick Cavaliere
(74) Attorney, Agent, or Firm—Foley & Lardner

(57) ABSTRACT

An automotive variable valve timing engine arranged to control the quantity of intake air to be supplied to a cylinder by regulating valve timings of an intake valve. An intake air quantity measuring device is provided for measuring the intake air quantity. An intake air quantity estimating system is provided including a control unit which is programmed to carry out (a) judging that a trouble arises in the intake air quantity measuring device, so as to provide a judgment result, and (b) calculating the intake air quantity in accordance with the valve timing of the intake valve, upon providing the judgment result.

10 Claims, 6 Drawing Sheets

VARIABLE VALVE TIMING ENGINE

BACKGROUND OF THE INVENTION

This invention relates to improvements in a variable valve timing engine which is provided with intake valves whose valve timings are freely controllable so as to regulate an intake air quantity, and more particularly to a system for estimating the intake air quantity when a trouble arises in an intake air quantity measuring device in the variable valve timing engine.

A variable valve timing engine whose valve timings are freely controllable to regulate an intake air quantity has been proposed as disclosed in Japanese Patent Provisional Publication No. 10-37727. This variable valve timing engine is provided in its intake air passageway with an intake air quantity measuring device such as an airflow meter.

SUMMARY OF THE INVENTION

In such a variable valve timing engine, an intake air quantity measured by an intake air quantity measuring device such as an airflow meter is important for operation of the engine, i.e., for decision of a fuel injection quantity and the like. In the event that a trouble arises in the intake air quantity measuring device, the intake air quantity cannot be measured thereby seriously affecting operation of the engine.

In a usual engine, control for the intake air quantity is accomplished by a throttle valve. Accordingly, when a trouble arises in the intake air quantity measuring device, the intake air quantity can be estimated from the opening degree of the throttle valve (or opening area of the intake air passageway) for the backup purpose, thereby solving the above problems.

However, in the conventional variable valve timing engine of the type for controlling the intake air quantity by varying the valve timings of the intake valves, in general, no throttle valve is provided, or otherwise a throttle valve is provided only for the purpose of developing vacuum in the intake air passageway. As a result, it is impossible to estimate the intake air quantity from the opening degree of the throttle valve when a trouble arises in the intake air quantity measuring device. Thus, the conventional variable valve timing engine cannot solve the above problems.

In view of the above, it is an object of the present invention to provide an improved variable valve timing engine of the type wherein an intake air quantity is controllable by regulating valve timings of an intake valve, which can effectively overcome drawbacks encountered in conventional variable valve timing engines of the similar types.

Another object of the present invention is to provide an improved variable valve timing engine of the type wherein an intake air quantity is controllable by regulating valve timings of an intake valve, which engine is provided with an intake air quantity estimating system which can accurately estimate the intake air quantity in the event that a trouble arises in an intake air quantity measuring device such as an airflow meter.

A further object of the present invention is to provide an improved variable valve timing engine of the type wherein an intake air quantity is controllable by regulating valve timings of an intake valve, which engine is provided with an intake air quantity estimating system by which the intake air quantity can be accurately estimated in accordance with valve timings of the intake valve.

An aspect of the present invention resides in a variable valve timing engine which comprises an intake valve whose valve timing is variable to control a quantity of intake air to be supplied to a cylinder. An intake air quantity measuring device is provided for measuring the intake air quantity. An intake air quantity estimating system is provided including a control unit which is programmed to carry out (a) judging that a trouble arises in the intake air quantity measuring device, so as to provide a judgment result, and (b) calculating the intake air quantity in accordance with the valve timing of the intake valve, upon providing the judgment result.

Another aspect of the present invention resides in a method of operating a variable valve timing engine having an intake valve whose valve timing is variable to control an quantity of intake air to be supplied to a cylinder, and an intake air quantity measuring device for measuring the intake air quantity. The operating method comprises an intake air quantity estimating process which includes (a) judging that a trouble arises in the intake air quantity measuring device, so as to provide a judgment result; and (b) calculating the intake air quantity in accordance with the valve timing of the intake valve, upon providing the judgment result.

DETAILED DESCRIPTION OF THE INVENTION

Figure 1:
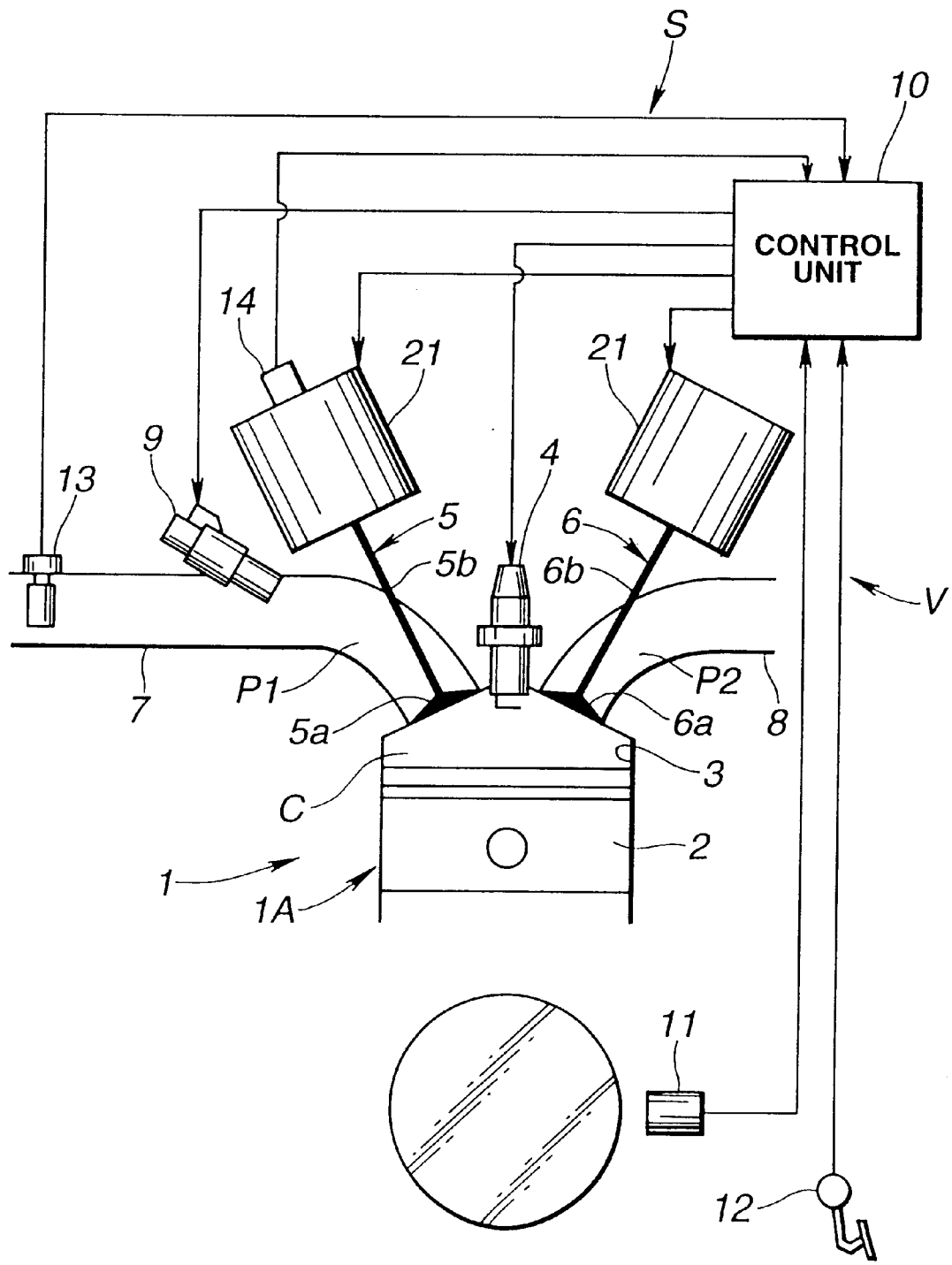
FIG. 1 is a schematic illustration of a first embodiment of a variable valve timing engine according to the present invention.

Referring now to FIG. 1, an embodiment of a variable valve timing engine according to the present invention is illustrated by the reference numeral 1. The engine 1 in this instance is an internal combustion engine mounted on an automotive vehicle (not shown). The engine 1 includes an engine main body 1A which has a plurality of engine cylinders C, though only one cylinder C is shown. A piston 2 is disposed in each cylinder C to be movable in a reciprocating manner, defining a combustion chamber 3 in the cylinder C. The engine main body 1A is formed with an intake port P1 and an exhaust port P2 which are respectively connected with an intake air passageway 7 and an exhaust gas passageway 8. Electromagnetically operated intake and exhaust valves 5, 6 are provided in the engine main body 1A.

The intake valve 5 has a valve head 5a which is movably disposed to open and close the intake port P1, defining the combustion chamber 3. The exhaust valve 6 has a valve head 6a which is movably disposed to open and close the intake port P2, defining the combustion chamber 3. A spark plug 4 is disposed to project in the combustion chamber 3 and located between the intake and exhaust valves 5, 6.

Figure 2:
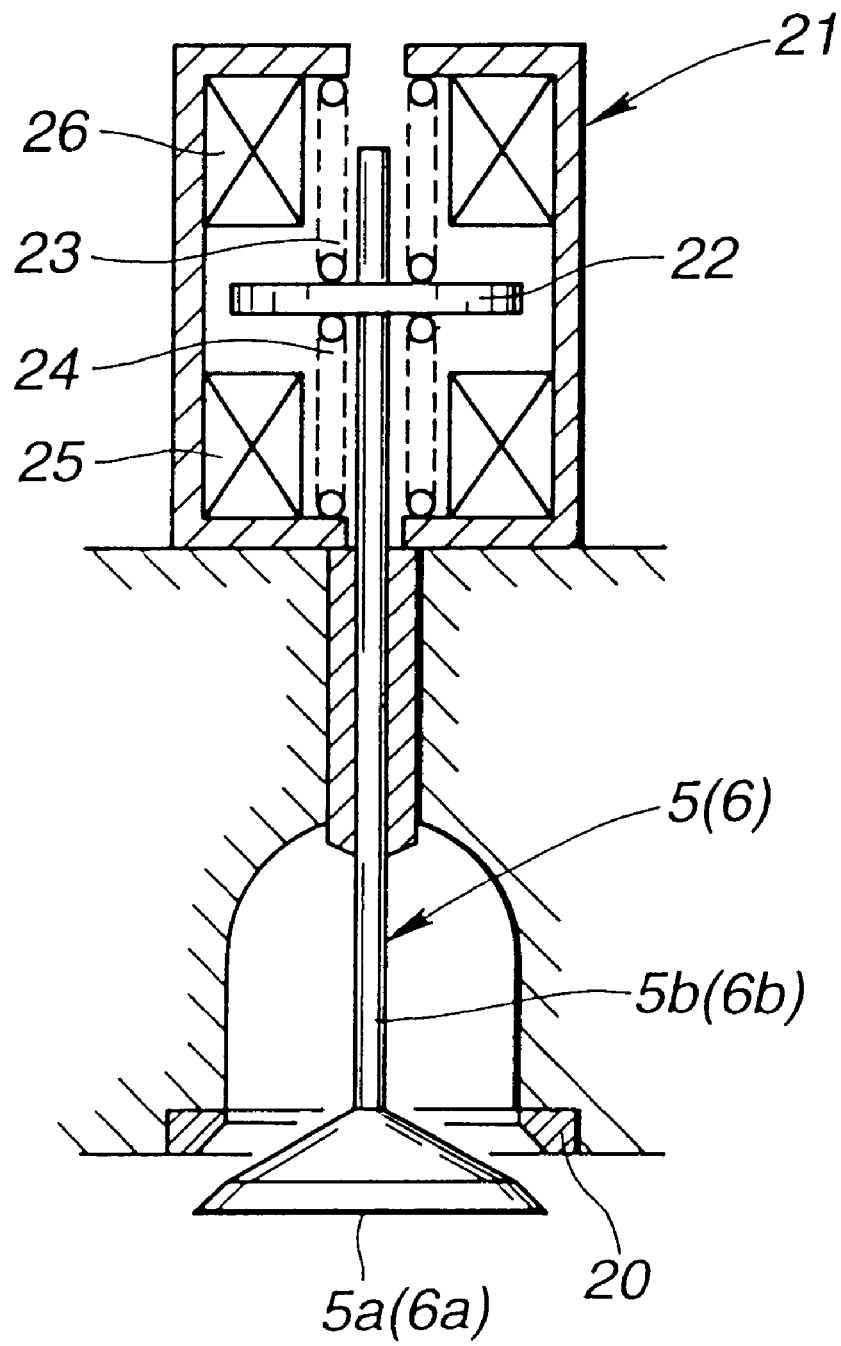
FIG. 2 is an enlarged schematic view of an intake or exhaust valve provided with an electromagnetic control device for the valve.

As shown in FIG. 2, each of the intake and exhaust valves 5, 6 is provided with an electromagnetic valve driving device 21 forming part of a valve timing variably controlling system V for variably controlling the valve timing of each of the intake and exhaust valve 5, 6. The electromagnetic valve driving device 21 includes a movable member 22 which is fixedly secured to a valve stem 5b (6b) of the intake or the exhaust valve 5 (6). The valve head 5a (5b) of the intake valve 5 or the exhaust valve 6 is movably positioned to be seated on or separated from a valve seat 20 so as to open or close the intake port P1 or the exhaust port P2. The valve seat 20 defines thereinside a part of the intake or exhaust port P1, P2. The movable member 22 is positioned between upper and lower springs 23, 24 to be biased at a neutral position at which the valve seat 5a (6a) is slightly separate from the valve seat 20. An lower electromagnetic coil 25 is disposed under the movable member 22 and adapted to attract downward the movable member 22. An upper electromagnetic coil 26 is disposed above the movable member 22 and adapted to attract upward the movable member 22.

Accordingly, in order to cause the valve 5 (6) to open in which the valve head 5a (5b) is separated from the valve seat 20, electric current is passed through the lower electromagnetic coil 25 after stopping passage of electric current through the upper electromagnetic coil 26. Thus, the movable member 22 is moved downward and attracted to the lower electromagnetic coil 25, thereby lifting the valve head 5a (5b). Conversely in order to cause the valve 5 (6) to close in which the valve head 5a (5b) is brought into contact with the valve seat 20, electric current is passed through the upper electromagnetic coil 25 after stopping passage of electric current through the lower electromagnetic coil 26. Thus, the movable member 22 is moved upward and attracted to the upper electromagnetic coil 26, thereby causing the valve head 5a (5b) to be seated on the valve seat 20.

Turning back to FIG. 1, an electronically controlled fuel injector valve 9 is disposed to project into the intake port P1 communicable with the combustion chamber 3 through the intake valve 5. Here, the electromagnetic valve driving devices 21, 21 for the respective intake and exhaust valves 5, 6, the fuel injector valve 9 and the spark plug 4 are electrically connected to a control unit 10 so as to be controlled by the control unit 10. The control unit 10 is in turn electrically connected to a crank angle sensor 11, an accelerator operation amount sensor 12, an airflow meter 13, and the like. The crank angle sensor 11 is adapted to output a signal representative of a crank angle of a crank shaft (not shown) of the engine, in timed relation to an engine revolution. It will be understood that an engine speed is detected in accordance with the output signal from the crank angle sensor 11. The accelerator operation amount sensor 12 is adapted to detect a depression amount of an accelerator pedal (not identified) and to output a signal representative of the depression amount. The airflow meter 13 is adapted to detect a quantity of intake air flowing through the intake air passageway 7 and to output a signal representative of the intake air quantity. Such signals from the sensors 11, 12, the meter 13 and the like are input to the control unit 10.

In the engine 1 of this embodiment, for the purpose of improving fuel economy under reduction of pumping loss, the intake air quantity is controlled by regulating valve timings of the electromagnetically operated intake and exhaust valves 5, 6, particularly by making an early inlet valve closure (EIVC), i.e., by advancing the closing valve timing of the intake valve 5, thus accomplishing a so-called non-throttle engine operation. A fuel injection quantity of the fuel injector valve 9 (a quantity of fuel to be injected from the fuel injector valve) is controlled to form an air-fuel mixture having a certain air-fuel ratio, in accordance with the intake air quantity measured by the airflow meter 13. It is to be noted that when the airflow meter 13 is in trouble or out of order, a quantity of intake air for backup purpose will be employed as discussed after. The intake air quantity for the backup purpose is estimated by an intake air quantity estimating system S including the control unit 10. The spark plug 4 is controlled to generate spark, for example, at a spark timing corresponding to a minimum advance for best torque or inside a knocking limitation outside which engine knocking occurs.

Here, a routine of control for the valve timings of the intake and exhaust valves 5, 6 under the action of the valve timing variably controlling system V will be discussed with a flowchart in FIG. 3. A routine of this control is executed every a certain time period.

At a step S1, the accelerator operation amount, the engine speed and the like are input to the control unit 10.

At a step S2, a target intake air quantity (a target value of the intake air quantity) corresponding to a target torque is calculated, in accordance with the accelerator pedal depression amount or the like.

At a step S3, target valve timings of the respective intake and exhaust valves 5, 6 are calculated. Specifically, the opening timing (IVO) of the intake valve 5 is decided at a timing near top dead center (TDC). The closing timing (IVC) of the intake valve 5 is decided in accordance with the target intake air quantity and the engine speed. The opening timing (EVO) and the closing timing (EVC) of the exhaust valve 6 are decided respectively at timings for providing the highest thermal efficiency of the engine.

At a step S4, the calculated target valve timings are output from the control unit 10 so as to carry out a valve timing control for the valve timings of the intake and exhaust valves 5, 6.

Next, a routine of calculation of the intake air quantity will be discussed with reference to the flowchart in FIG. 4. The routine is executed every a certain time period.

At a step S11, a judgment is made as to whether a trouble arises in the airflow meter 13 or not. This judgment provides such a judgement result that the trouble arises in the airflow meter 13, for example, when the intake air quantity measured by the airflow meter 13 is at a level corresponding to 0 (zero) even though the engine speed is above a certain level.

When the judgement provides such a judgment result that the airflow meter is in a normal condition, the flow of the routine goes to a step S12 at which the intake air quantity is calculated in accordance with the output signal from the airflow meter 13. Accordingly, a control for the fuel injection quantity is carried out in accordance with the intake air quantity measured by the airflow meter 13.

When the judgement provides such a judgment result that the trouble arises in the airflow meter 13, the flow goes to a step S13 and to a step S14.

At the step S13, an actual valve timing of the intake valve 5 is detected. Specifically, as shown in FIG. 1, a valve lift sensor 14 is provided to detect an actual closing timing (IVC) of the intake valve 5.

Figure 5:
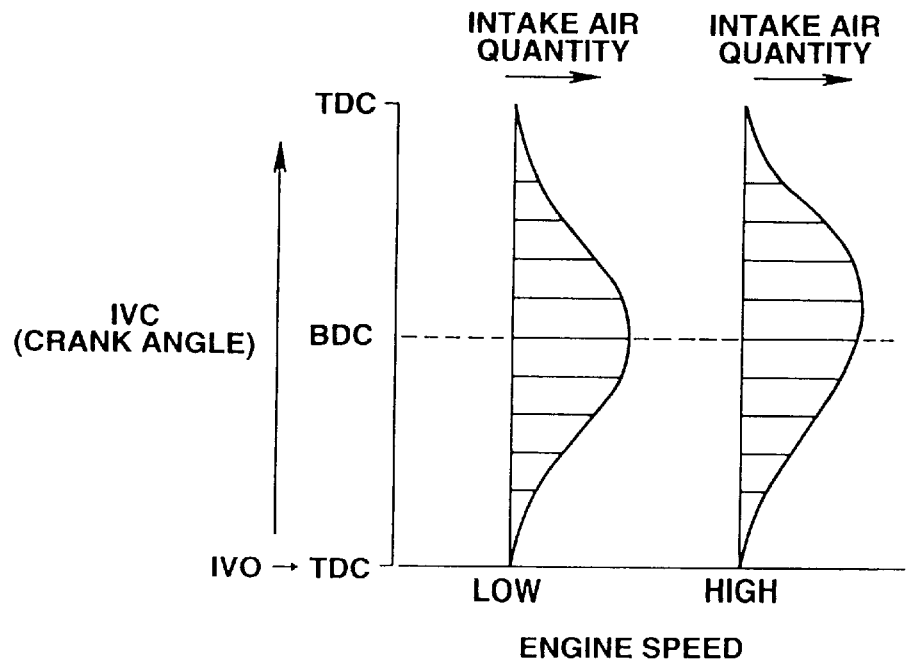
FIG. 5 is a graphical representation for explaining determination of the intake air quantity in the routine of FIG. 4.

At the step S14, the intake air quantity is calculated in accordance with the actual valve timing of the intake valve 5 (specifically, the actual closing timing IVC of the intake valve 5) and the engine speed, by using a formula or a map. This calculation of the intake air quantity is for the backup purpose. Specifically, for example, the intake air quantity is determined in accordance with the actual IVC by using tables which are provided for each engine speed, as shown in FIG. 5. It will be understood that the intake air quantity becomes the maximum level when the actual IVC is at bottom dead center (BDC), on a low engine speed side; while the intake air quantity becomes the maximum level when the actual IVC is after bottom dead center under the action of inertia of intake air, on a high engine speed side.

Additionally, as occasion demands, the actual intake air quantity calculated in accordance with the actual closing timing (IVC) of the intake valve and the engine speed is corrected with the closing timing (EVC) of the exhaust valve, the opening timing (IVO) of the intake valve, atmospheric pressure, a temperature of the intake air and the like, for the reasons set forth below. The closing timing (EVC) of the exhaust valve largely affects an amount of remaining exhaust gas or residual gas in the cylinder, in which an amount of fresh air to newly enter the cylinder decreases as the remaining exhaust gas increases. The opening timing (IVO) of the intake valve affects the amount of the remaining exhaust gas, the amount of the fresh air to be blown out of the cylinder, in cooperation with the closing timing (EVC) of the exhaust valve. The atmospheric pressure and the intake air temperature affect air density and the quantity (mass) of the intake air.

Furthermore, in case that a throttle valve is used in the engine for the purpose of generating vacuum within the intake air passageway, the intake air quantity calculated in accordance with the actual closing timing (IVC) of the intake valve and the engine speed is corrected also with an opening degree of the throttle valve. This is because a pressure within the intake air passageway affects the intake air quantity.

Thus, in the event that the trouble arises in the airflow meter 13, the fuel injection quantity of the fuel injector valve 9 is controlled in accordance with the intake air quantity for the backup purpose, calculated in accordance with the actual valve timing of the intake valve 5.

It will be appreciated that according to the above embodiment, accuracy of calculation for the intake air quantity can be improved by employing the actual valve timing though the valve lift sensor 14 is required. Additionally, since the intake air quantity is calculated in accordance with the engine speed in addition to the valve timing of the intake valve, the intake air quantity can be prevented from being affected by change in charging efficiency owing to inertia and the like of intake air under engine speed change.

Figure 4:
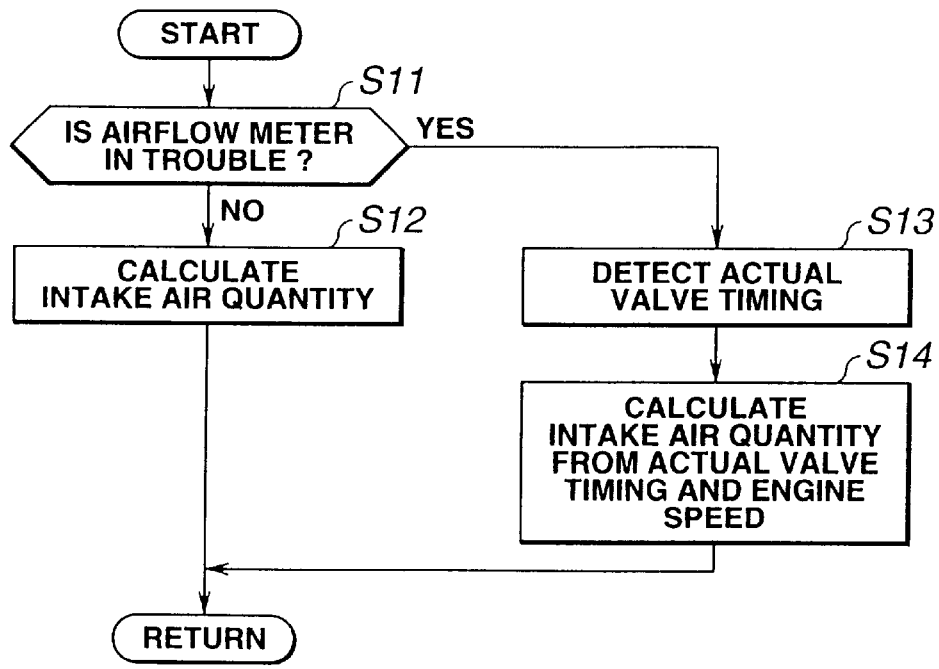
FIG. 4 is a flowchart of a routine for calculation of an intake air quantity, used in the engine of FIG. 1.
Figure 6:
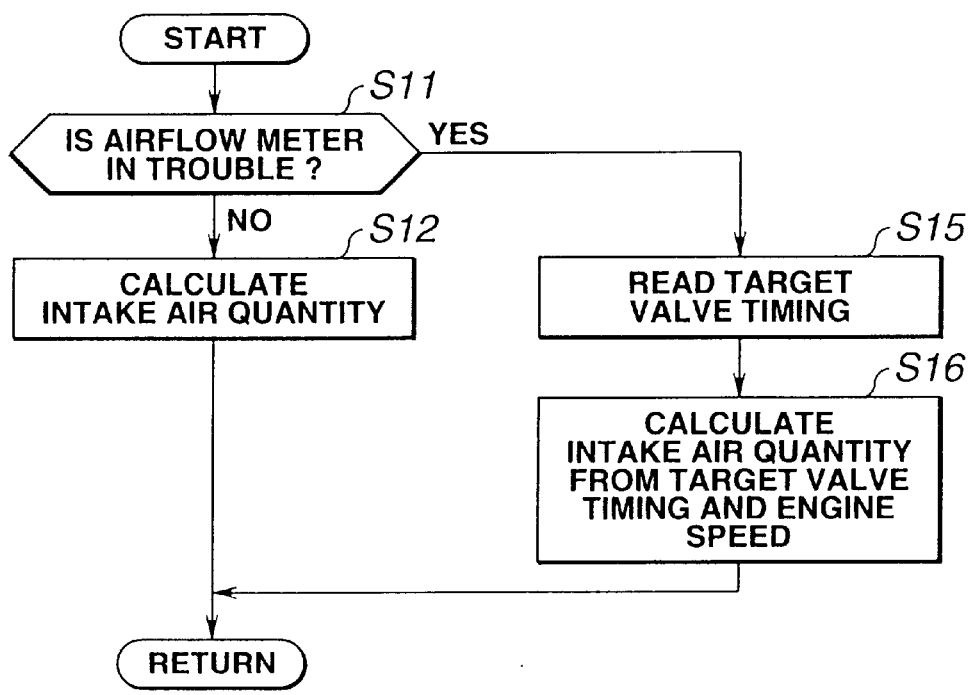
FIG. 6 is a flowchart similar to that in FIG. 4, but illustrating a routine for calculation of the intake air quantity, used in a second embodiment of the variable valve timing engine according to the present invention.

FIG. 6 illustrates a routine of calculation of the intake air quantity in a second embodiment of the variable valve timing engine according to the present invention, similar to the first embodiment with the exception that steps S15 and S16 of the routine in FIG. 6 are executed in place of the steps S13 and S14 of the routine in FIG. 4. In this embodiment, when the judgement result at the step S11 is made such that the trouble arises in the airflow meter 13, the operations at steps S15 and S16 are executed.

Figure 3:
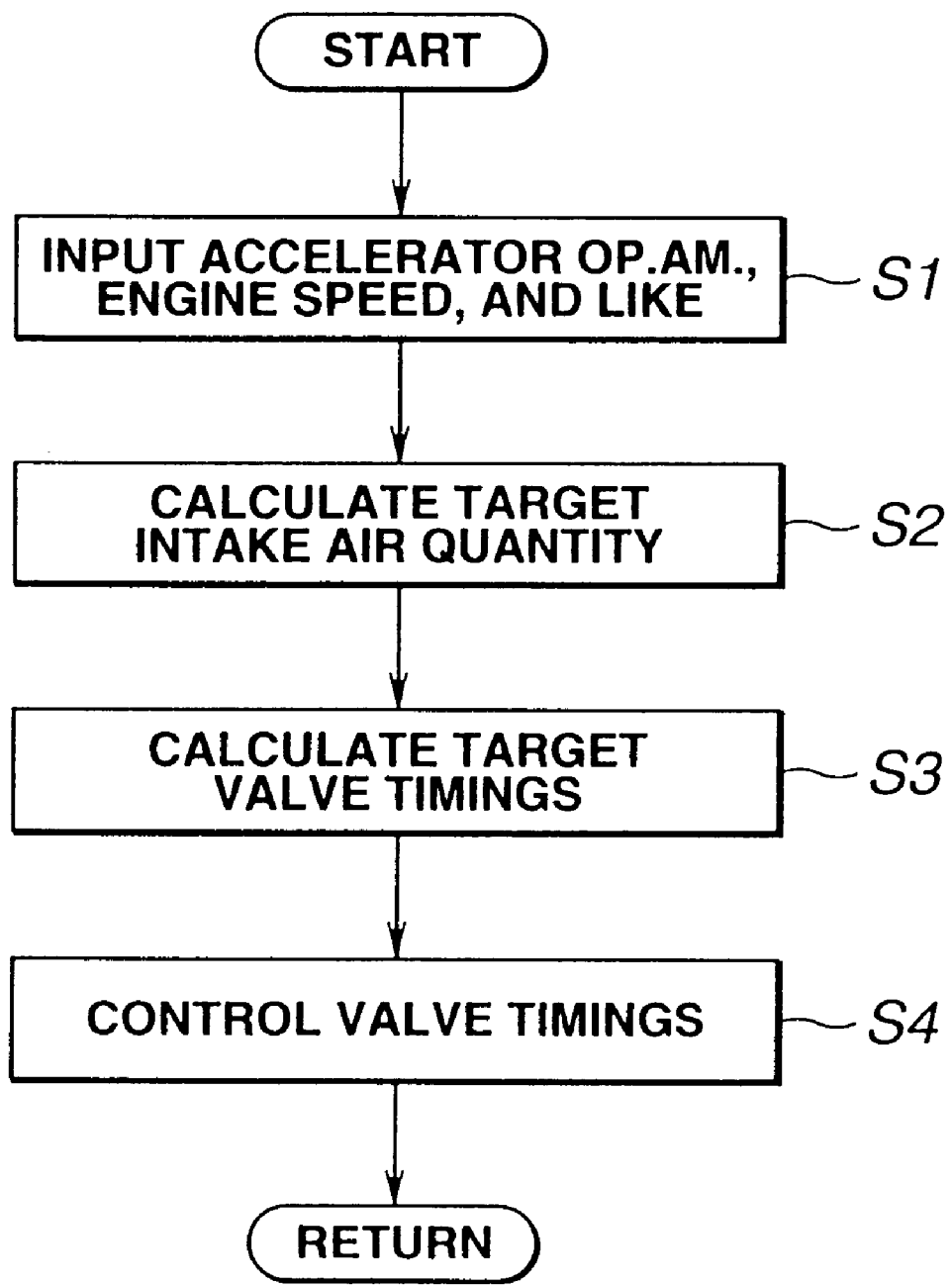
FIG. 3 is a flowchart of a control routine for valve timings of the intake and exhaust valves of the engine of FIG. 1.

At the step S15, the target valve timing (specifically, the target closing timing IVC) of the intake valve 5 calculated at the step S3 of the routine in FIG. 3 is read.

At the step S16, the intake air quantity is calculated in accordance with the target valve timing (specifically, the target closing timing IVC) of the intake valve 5 and the engine speed.

It will be appreciated that according to this embodiment, the calculation of the intake air quantity can be achieved without using the valve lift sensor 14.

Figure 7:
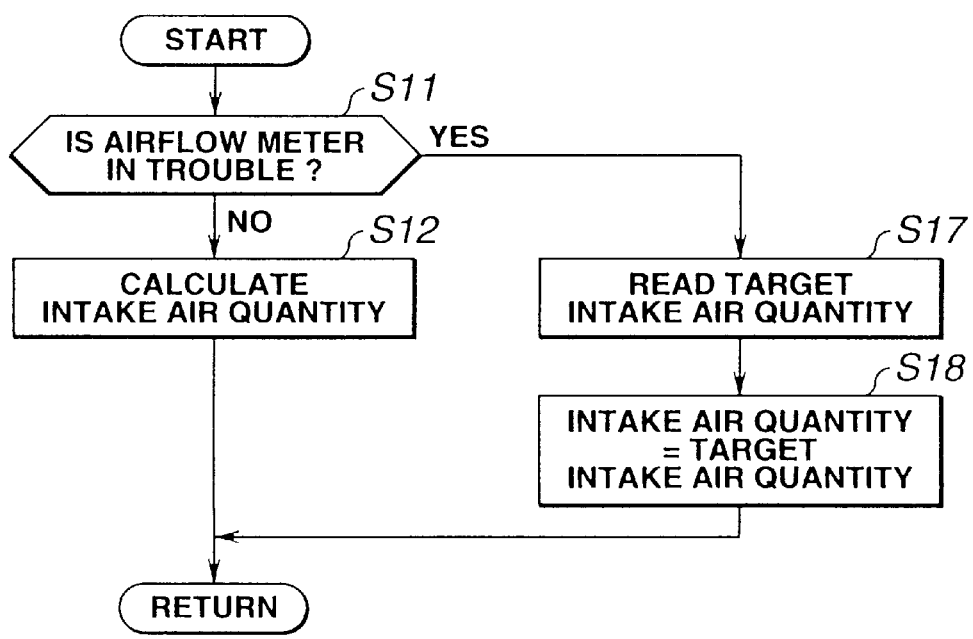
FIG. 7 is a flowchart similar to that in FIG. 4, but illustrating a routine for calculation of the intake air quantity, used in a third embodiment of the variable valve timing engine according to the present invention.

FIG. 7 illustrates a routine of calculation of the intake air quantity in a third embodiment of the variable valve timing engine according to the present invention, similar to the first embodiment with the exception that steps S17 and S18 of the routine in FIG. 7 are executed in place of the steps S13 and S14 in FIG. 4. In this embodiment, when the judgement result at the step S11 is made such that the trouble arises in the airflow meter 13, the operations at steps S17 and S18 are executed.

At the step S17, the target intake air quantity calculated at the step S2 of the routine in FIG. 3 is read.

At the step S18, the intake air quantity is calculated in accordance with the target intake air quantity. In other words, the target intake air quantity is used as it is, as the intake air quantity.

It will be appreciated that according to this embodiment, the calculation of the intake air quantity can be achieved very easily.

Figure 8:
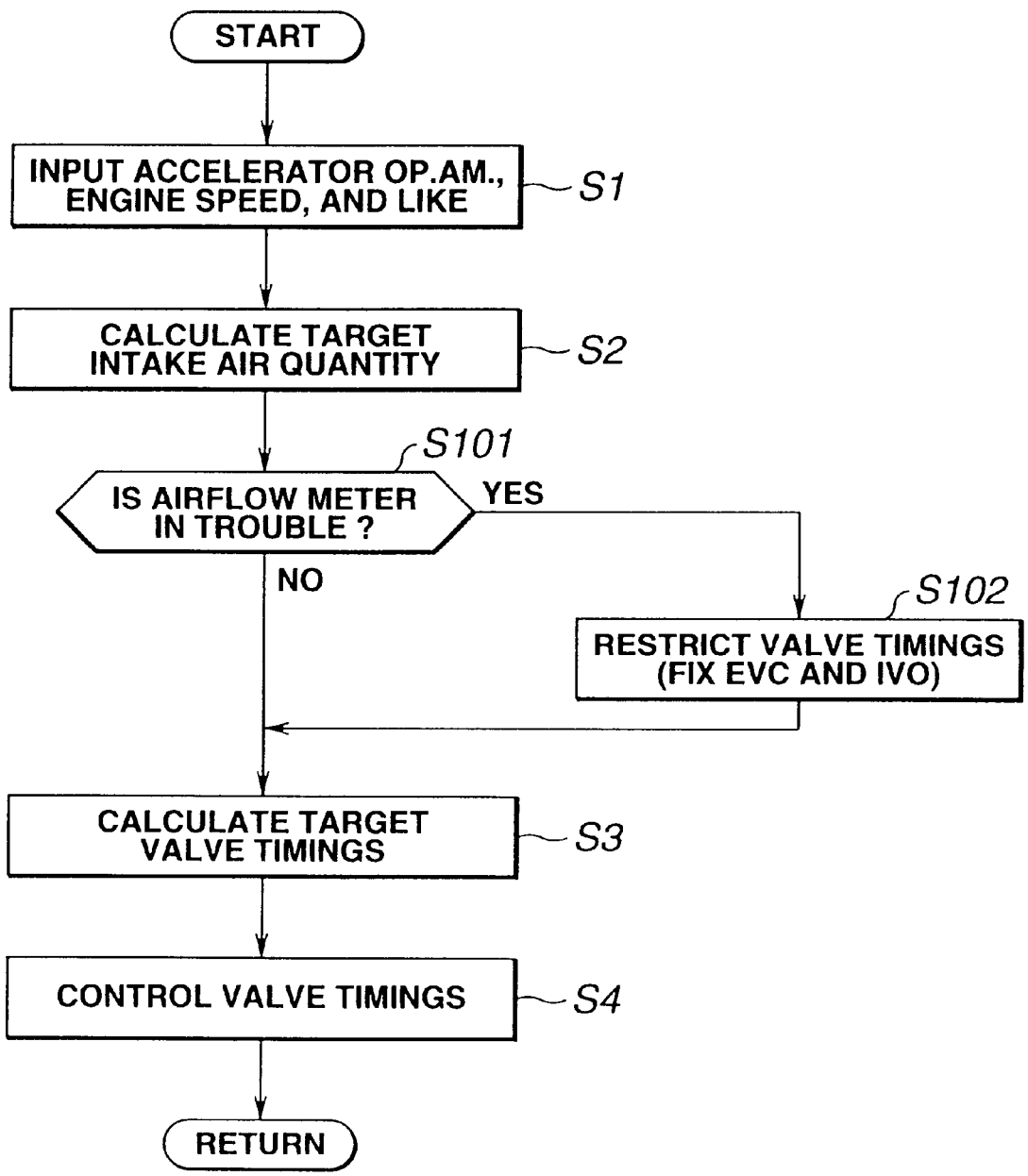
FIG. 8 is a flowchart similar to that in FIG. 3, but illustrating a control routine for valve timings of the intake and exhaust valves of a fourth embodiment of the variable valve timing engine according to the present invention.

FIG. 8 illustrates a routine of control for the valve timings of the intake and exhaust valves 5, 6 of a fourth embodiment of the variable valve timing engine 1 according to the present invention, similar to the first embodiment except for addition of steps S101 and S102 as intermediate treatments to the routine in FIG. 3. In other words, in this embodiment, one of the flows in FIGS. 4, 6 and 7 is used in combination with the flow in FIG. 3.

Prior to calculation of the target valve timing, a judgment is made as to whether or not a trouble arises in the airflow meter at a step S101.

In the event that the trouble arises in the airflow meter 13, a restricting condition is added to the target valve timing. Specifically, the closing timing (EVC) of the exhaust valve and the opening timing (IVO) of the intake valve are fixed in such a manner as to provide no valve overlap.

Influence of the closing timing (EVC) of the exhaust valve and the opening timing (IVO) of the intake valve onto the intake air quantity becomes very complicated particularly in case that the opening timing (IVO) of the intake valve is made before the closing timing (EVC) of the exhaust valve, i.e., in case that a valve overlap is made. In this regard, according to this embodiment, estimation of the intake air quantity can be achieved simply and at a high accuracy upon previously adding a restriction onto such conditions.

While only the electromagnetic valve driving device 21 has been shown and described for driving the intake or exhaust valve in the above embodiments, it will be understood that the driving device 21 may be replaced with a hydraulic valve driving device (not shown) for driving the intake or exhaust valve under the action of hydraulic fluid.

The entire contents of Japanese Patent Application P10-252714 (filed Sep. 7, 1998) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A variable valve timing engine, comprising:
   an intake valve whose valve timing is variable to control a quantity of intake air to be supplied to a cylinder;
   an intake air quantity measuring device for measuring the intake air quantity; and
   an intake air quantity estimating system including a control unit programmed to carry out
   judging that a trouble arises in said intake air quantity measuring device, so as to provide a judgment result, and
   calculating the intake air quantity in accordance with the valve timing of said intake valve, upon providing the judgment result.

2. A variable valve timing engine as claimed in claim 1, further comprising a valve lift sensor for detecting an actual valve timing of said intake valve, wherein said control unit is programmed to carry out
   judging that a trouble arises in said intake air quantity measuring device, so as to provide a judgment result, and
   calculating the intake air quantity in accordance with the actual valve timing, upon providing the judgment result.

3. A variable valve timing engine as claimed in claim 1, wherein said control unit is programmed to carry out
   calculating a target valve timing as a command value for said intake valve,
   judging that a trouble arises in said intake air quantity measuring device, so as to provide a judgment result, and
   calculating the intake air quantity in accordance with the target valve timing, upon providing the judgment result.

4. A variable valve timing engine as claimed in claim 1, wherein said control unit is programmed to carry out
   judging that a trouble arises in said intake air quantity measuring device, so as to provide a judgment result, and
   calculating the intake air quantity in accordance with the valve timing of said intake valve and at least an engine speed, upon providing the judgment result.

5. A variable valve timing engine as claimed in claim 1, wherein said control unit is programmed to carry out
   calculating a target intake air quantity for deciding a target valve timing which serves as a command value for said intake valve,
   judging that a trouble arises in said intake air quantity measuring device, so as to provide a judgment result, and
   calculating the intake air quantity in accordance with the target intake air quantity.

6. A variable valve timing engine as claimed in claim 1, further comprising an exhaust valve, wherein said control unit is programmed to carry out
   judging that a trouble arises in said intake air quantity measuring device, so as to provide a judgment result,
   adding a restricting condition to valve timings of the intake and the exhaust valve, and
   calculating the intake air quantity in accordance with the valve timing of said intake valve, upon providing the judgment result.

7. A variable valve timing engine as claimed in claim 1, wherein said intake valve is electromagnetically operated to be axially movable in a reciprocating manner.

8. A variable valve timing engine as claimed in claim 1, wherein said intake air measuring device is an airflow meter disposed in an intake air passageway leading to the cylinder.

9. A variable valve timing engine, comprising:
   an intake valve whose valve timing is variable to control a quantity of intake air to be supplied to a cylinder;
   an intake air quantity measuring device for measuring the intake air quantity; and
   an intake air quantity estimating system including
   means for judging that a trouble arises in said intake air quantity measuring device, so as to provide a judgment result, and
   means for calculating the intake air quantity in accordance with the valve timing of said intake valve, upon providing the judgment result.

10. A method of operating a variable valve timing engine having an intake valve whose valve timing is variable to control a quantity of intake air to be supplied to a cylinder, and an intake air quantity measuring device for measuring the intake air quantity, said method comprising an intake air quantity estimating process including
    judging that a trouble arises in said intake air quantity measuring device, so as to provide a judgment result; and
    calculating the intake air quantity in accordance with the valve timing of said intake valve, upon providing the judgment result.

* * * * *